United States Patent [19]

Zdunek et al.

[11] Patent Number: 5,115,233

[45] Date of Patent: May 19, 1992

[54] SHARED DATA/VOICE COMMUNICATION SYSTEM WITH PROGRAMMABLE DATA PRIORITY

[75] Inventors: Kenneth J. Zdunek, Schaumburg; Jay R. Krebs, Crystal Lake, both of Ill.

[73] Assignee: Motorola, Inc., Schaumburg, Ill.

[21] Appl. No.: 175,888

[22] Filed: Mar. 31, 1988

[51] Int. Cl.$^5$ .............................................. G08B 5/22
[52] U.S. Cl. ........................... 340/825.44; 340/825.47; 340/825.5
[58] Field of Search .................... 370/94.1, 111, 110.1; 455/603, 58; 340/825.5, 825.51, 825.52, 825.44-825.48; 379/94, 98

[56] References Cited

U.S. PATENT DOCUMENTS

| | | |
|---|---|---|
| 3,311,704 | 3/1967 | Filipowsky et al. ............ 370/111 X |
| 4,291,200 | 9/1981 | Smith .................................... 379/94 |
| 4,332,027 | 5/1982 | Malcolm et al. ....................... 370/94 |
| 4,418,416 | 11/1983 | Lese et al. ........................ 455/603 X |
| 4,517,669 | 5/1985 | Freeburg et al. ...................... 370/82 |
| 4,519,068 | 5/1985 | Krebs et al. ............................ 370/82 |
| 4,542,380 | 9/1985 | Beckner et al. .................. 340/825.5 |
| 4,590,473 | 5/1986 | Burke et al. |
| 4,636,791 | 1/1987 | Burke et al. |
| 4,716,407 | 12/1987 | Borras et al. ..................... 340/825.5 |
| 4,722,082 | 1/1988 | Furuya et al. ................ 340/825.5 X |

OTHER PUBLICATIONS

D. Lefkon, "A LAN Primer," Byte, Jul. 1987, pp. 147-152, 154.

D. E. O'Rourke, "Future of Data Communications," An Introduction to Data Communication, 1987, American Institute, Inc., Madison, N.J.

*Primary Examiner*—Ulysses Weldon
*Attorney, Agent, or Firm*—Donald B. Southard; Anthony J. Sarli

[57] ABSTRACT

A shared data/voice communication system wherein data traffic may be guaranteed priority at a set, but programmable, level of system capacity and wherein interference between such data and voice traffic is effectively minimized. The system operates on standardized channel access rules in the data mode, as well as requesting permission to operate in the voice mode, which if granted, effects a specific protocol to condition the system for voice traffic and manage the same during such pendency. Long and short timers are selectively activated depending upon whether the system is in the voice or data mode to minimize collisions of the system radio data terminals requesting channel access.

24 Claims, 5 Drawing Sheets

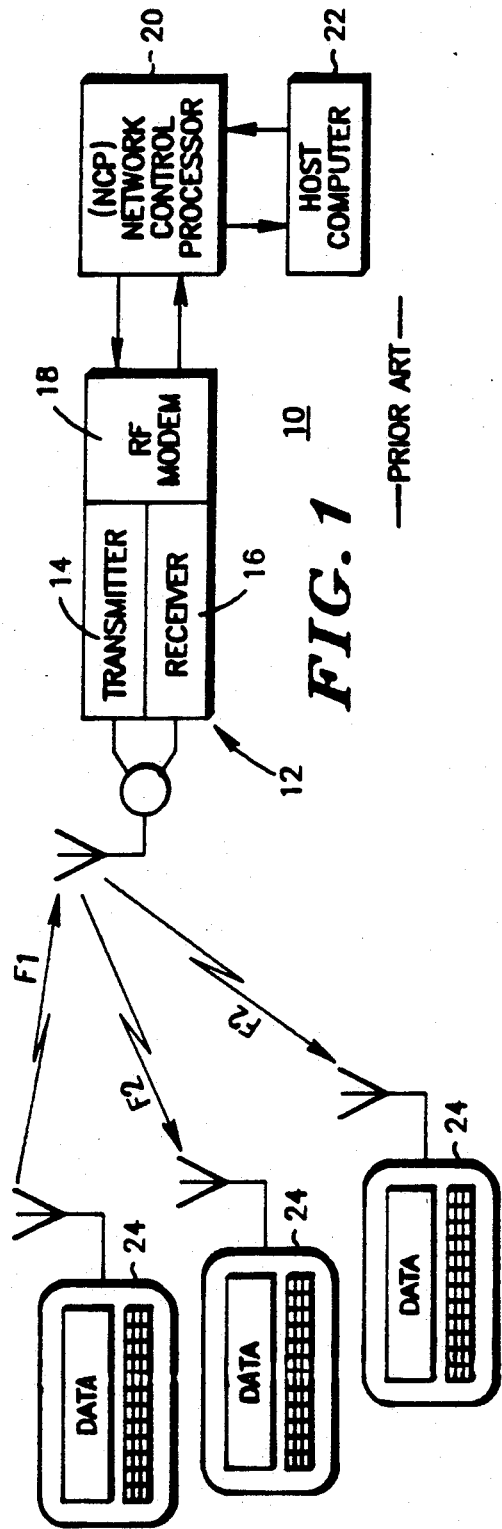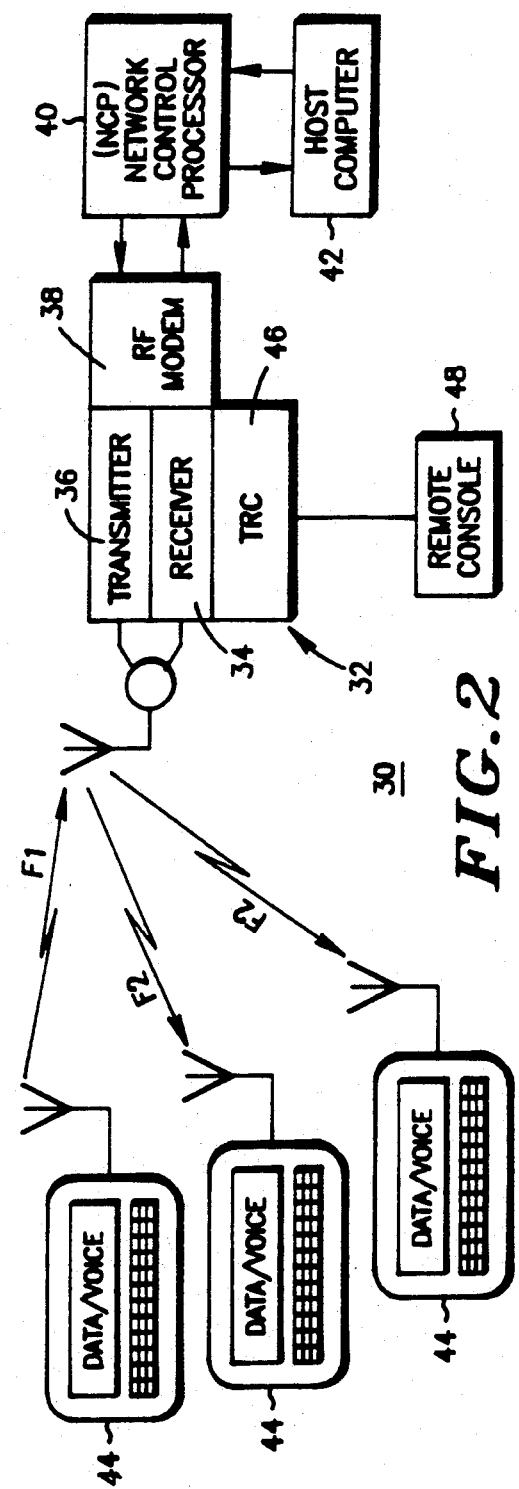

SHARED DATA/VOICE COMMUNICATION SYSTEM WITH PROGRAMMABLE DATA PRIORITY

BACKGROUND OF THE INVENTION

This invention relates in general to communication systems and more particularly to a shared data/voice communication system wherein the data capacity may be programmed and maintained as desired and also wherein interference between voice and data traffic is effectively minimized.

Communication systems which process data information are becoming more and more common in the industry. In point of fact, systems which handle data only are relatively wide spread. Typically such radio data systems comprise a base station with full duplex capability, a network control processor (NCP), front end to a system host computer, and a plurality of portable radio data terminals operating in half duplex mode.

As may be expected, suitable channel access protocol arrangements are required to minimize terminal interference and keep the system operating with optimum efficiency. To this end, a protocol has been developed which has enjoyed wide spread application, referred to in the literature as "non-persistent busy tone (bit) multiple access". Basically, the protocol permits channel contention between radio data terminals. When one such terminal gains channel access and begins to transmit data, the base station informs/advises the other system data terminals of such by way of setting "inhibit bits" at predetermined locations or positions in the outbound data stream. When a data terminal encounters these inhibit bits, it waits for a random time before contending again for access to the channel. In this way, the system operates with minimum interference and an orderly process is established for all participating data terminals in the system to utilize the available capacity.

It should be noted that in such radio data systems, the information being communicated is in fact data. Without more, voice, or analog information, as such is not compatible. There are occasions, however, and increasingly so, where voice communications is very much desired. In some cases, it is absolutely essential. Of course, the user can communicate by voice with a separate mobile or portable unit operating on a completely different channel and/or communication system. As will be readily recognized, such option is quite expensive and, at the same time, inefficient.

There are, of course, systems that accommodate both voice and data on the same system, and even the same channel. However, these are primarily voice systems adapted to also accommodate in limited terms the transmission of data. They are primarily designed to effect channel management with suitable voice protocol arrangements which are not efficient for data management. Moreover, such systems have no means of guaranteeing the system will be used for a minimum level data transmission. Voice communication can and does frequently dominate system usage entirely.

What is needed is the ability to add to an existing efficiently operated data communication system the capability of voice communication as well, without changing the data access protocol being used therein. The addition of the voice communication capability should in no way increase the level of interference on such channel when units are operated in either voice or data mode. Moreover, there needs to be an effective means and method of guaranteeing that specific but programmable levels of data capacity are being utilized by the system even though it is shared by both the voice and data traffic.

SUMMARY OF THE INVENTION

Accordingly, it is an object of the present invention to provide a radio data communication system operating with a conventional channel access protocol, with an added voice communication capability without increasing a certain minimum level of interference.

A more particular object of the present invention is to provide a shared data and voice communication system of the foregoing type wherein the system radio data terminal units operating in data mode continue to utilize the conventional or standard channel access protocol so as not to impair system efficiency in that mode.

A still further object of the present invention is to provide a shared data and voice communication system of the foregoing type wherein programmable but specific, and thus guaranteed, levels of usage of the communication channel are provided for data transmission and processing.

In practicing the invention, a shared data and voice communication system is provided which has a centrally located base station controlled by a network control processor, as well as a plurality of data terminals with voice capability. The system operates with a predetermined channel access protocol in the data mode and wherein data priority is maintained for a set but programmable level of data usage. The system includes means in each of the data terminals for requesting voice mode for the communication system. And in the network control processor, suitable means are included for granting such requests, inhibiting all other system terminals from sending data messages during the pendency of the requesting terminal operating in the voice mode, as well as means for terminating the voice mode operation at an appropriate time and returning the base station to data mode only operation. The network control processor also includes means for maintaining a set programmable level of data traffic for the communication system by not granting any voice mode requests wherever and whenever the programmed level of data traffic has not been reached as programmed.

BRIEF DESCRIPTION OF THE DRAWINGS

FIG. 1 is a block diagram of a conventional data only communication system which may be considered as known in the art;

FIG. 2 is a block diagram of a shared voice and data communication system which has been constructed in accordance with the present invention;

BRIEF DESCRIPTION OF THE PREFERRED EMBODIMENT

Figure 3:
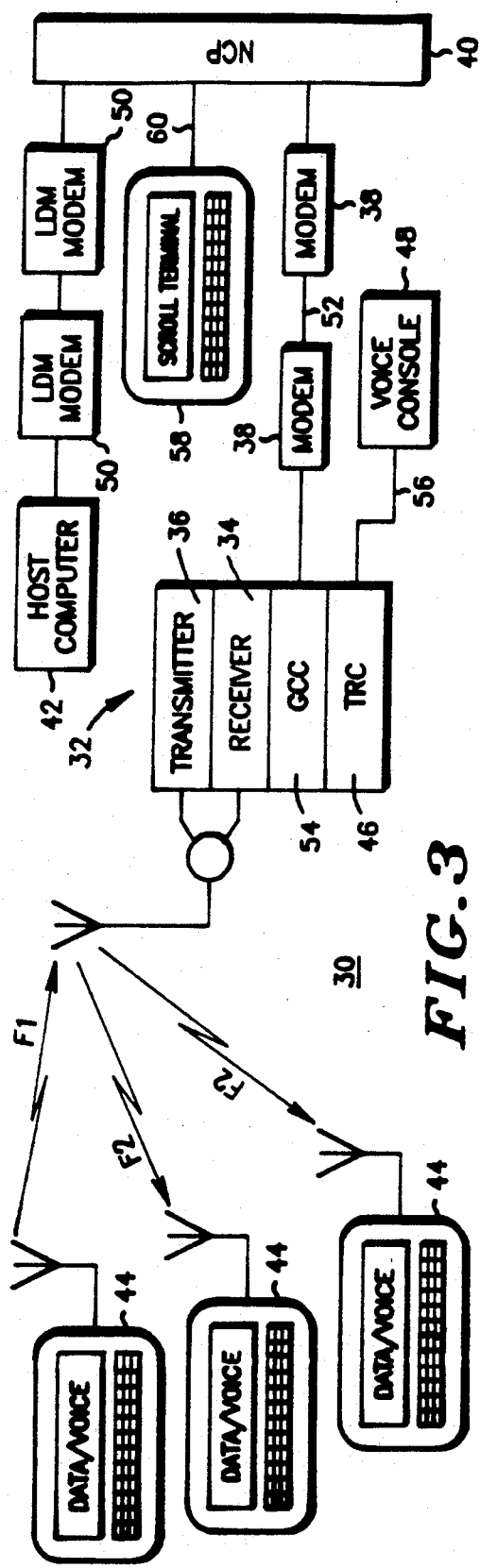
FIG. 3 is a further block diagram in more detail of the communication system of FIG. 2 showing a more detailed interconnection between the constituent elements thereof.

Referring now to the drawings, a typical radio data only communication system 10, which may be considered as known in the art, is illustrated in block form in FIG. 1. The system has a centrally located base station 12, comprising a transmitter 14 and receiver 16, operating in full duplex mode, which communicates with, by modem 18, and is controlled by, a network control processor (NCP) 20. The NCP in turn communicates with a host computer 22 as indicated. A plurality of portable radio data terminals 24 are also a part of the system 10, operating in half duplex mode.

As previously mentioned, a standard channel access protocol has been devised for managing the data communication system 10 of the above type described. The radio data terminals 24 individually seek channel access by transmitting data packets on the inbound channel. The base station/NCP 20 informs/advises the other (and listening) system terminals 24 of this fact by setting bits located at predetermined positions in the outbound stream. These bits may be referred to as "inhibit bits" and correspond to a conventional busy tone. If another terminal has a data message to be sent, it first monitors the channel and will sense the inhibit bits when set. Upon such occurring, the terminal waits a random time after which it monitors the channel again. This random time may be referred to as the inhibit delay time and is uniformly distributed between zero and some given time T, usually set to substantially correspond to the average inbound data packet length. At some point, perhaps after repeated attempts, the referenced terminal will find or sense no inhibit bits and will be free to transmit its intended data message packet.

The system 10 in FIG. 1 operates efficiently and effectively, but is capable of data only communication. For the reasons set forth in the background section previously, there is in many instances a need for voice capability as well. Note that it is a need for voice capability in essentially a system designed for processing data and not vice versa. It is not a system intended for voice communications only at the inception and, subsequently, where the capability of processing data is added.

The data system of the present invention, which permits limited voice communications, is set forth diagrammatically in FIG. 2, which system has been constructed in accordance with the precepts of the present invention. In broad terms, the system 30 of FIG. 2 is much like that of FIG. 1 in that a centrally located base station 32 is provided comprised of a receiver 34 and transmitter 36. Modem 38 permits communication with the NCP 40 which in turn communicates with a host computer 42. A plurality of portable/mobile radio data terminals 44 are also in integral part of the system. In this case, radio data terminals 44 are also capable of voice transmission and have a microphone (not shown) with a push-to-talk switch. Further, as a part of the arrangement for effecting voice capability, the tone remote console (TRC) 46 and remote console 48 is provided.

A more detailed representation of the system 30 is shown in FIG. 3. In addition to the previously referenced component parts, system 30 includes limited distance modems (LDM) 50 permitting communications between the NCP 40 and host computer 42 on a full duplex basis and are of the type referenced as HDLC ABM modems operating with the capability of 9.6 kilobits. A general communications controller (GCC) 54 is located at the base site intercoupled to the NCP through associated modems. Modem 38 of FIG. 2 is shown a pair of modems in FIG. 3, which are also of the HDLC ABM type with 9.6 kilobits capability. Wire lines indicated at 52 constitute a four-wire TELCO circuit to permit full duplex communications between base station 32 and NCP 40. A two-wire, voice grade, line 56 connects the TRC 46 with the remote console 48. Finally, a scroll mode terminal 58 is provided which is coupled by an RS-232 link 60 to the NCP 40. Data information is passed between the NCP 40 and the base station 32 via modems 38 and wire line 52 while voice communication is processed by the dispatcher at console 48 over wire line 56 to the base station 32. Terminal 58 permits the dispatcher to keep track of the data or voice mode the system is operating on as well as the identity of the user utilizing the system at any particular moment in time.

It will be recalled that system 32 is primarily designed to process data. Further, it operates with a specific channel access protocol as previously described in managing the data traffic over the system. Even though system 32 has been given the capability of voice transmission in accordance with the present invention, it is to retain such channel access protocol for handling the data but make provision for permitting and managing voice traffic as well. Accordingly, in the first instance, the portable radio data terminal 44 must request authorization to operate in the voice mode by first sending a request to talk (RTT) in the form of a data packet essentially in the same way as it does for data. Upon receipt at the base station 32, a decision by the NCP 40 must be made whether to grant such request. If in the affirmative, a suitable protocol arrangement must be initiated to grant the request and manage the ensuing voice communication while keeping other radio data terminals from attempting to communicate during the pendency of such voice message.

Figure 4:
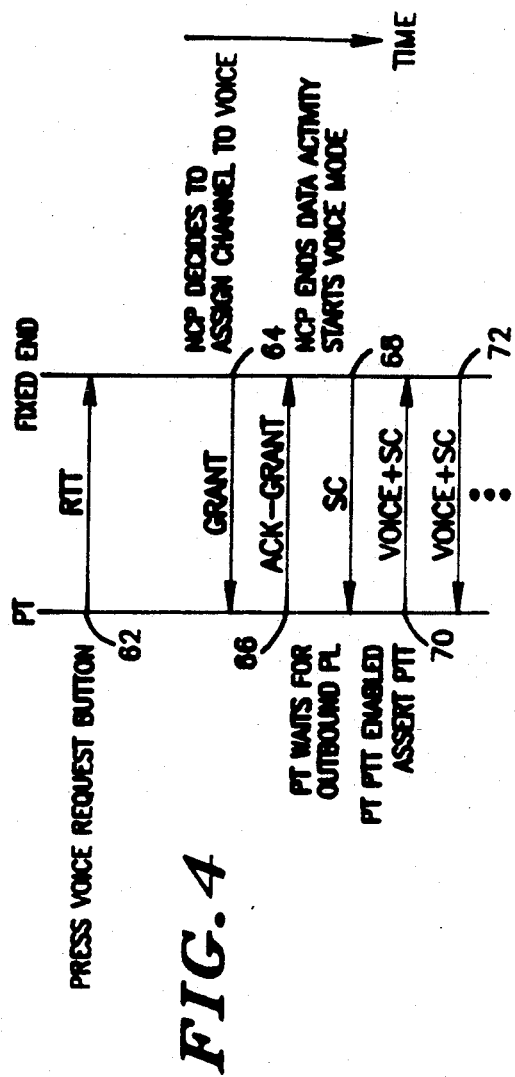
FIG. 4 is a diagramic representation of a request by a portable terminal for a grant by the central network control processor/base station and the associated protocol for operating the communications system in voice mode.

This is depicted graphically in FIG. 4 showing the necessary steps to initiate voice communication by a particular radio data terminal 44 and the ensuing protocol to establish the same and manage the system. The radio data terminal 44 initiates the request by pushing a voice request button on the terminal at step 62 which effects transmission of the appropriate data packet interpreted as a request to talk (RTT). Upon receipt at the base station and routed to the NCP a decision is made by it whether or not to assign the system channel to voice. The factors for making this decision will be discussed subsequently. If the decision is in the affirmative, the grant is made at step 64. Upon receipt by the portable radio data terminal 44, it acknowledges back the grant at step 66.

The data terminal then waits for further action by the NCP 40. The NCP ends all data activity on the channel and then initiates voice mode by first transmitting a supervisory, sub-audible code signal (SC) at step 68.

The sub-audible code may be either a tone or a digital signal as desired. Upon receipt thereof by the radio data terminal 44, voice communication may commence and is effected upon the push-to-talk switch (not shown) being activated at step 70. This causes the voice message to be transmitted along with the subaudible code signal. If the dispatcher wishes to send a voice message back to the radio data terminals, the same is likewise transmitted along with the subaudible code signal as indicated at step 72.

The voice activity continues until completed or is terminated by predetermined conditions. In general, voice activity may be terminated by any of the following: (a) overall call length time limit being exceeded; (b) voice inactivity time out being reached; (c) being terminated at the option of the dispatcher at his or her discretion; or (d) by being preempted by an emergency call.

Figure 5:
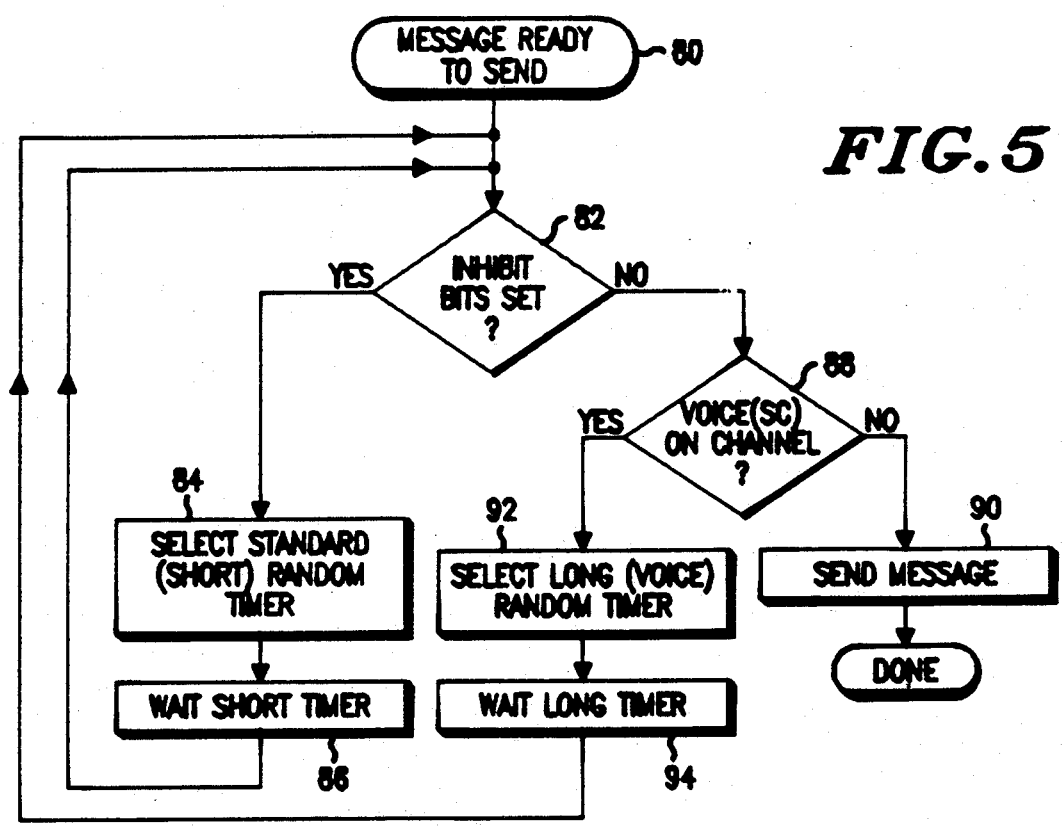
FIG. 5 is a flow chart of the channel access procedure effected by the system radio data terminals in data voice and data modes.

In this manner, the overall system 30 operates with either data or voice, but continues to function effectively using the standard data channel access rules. The system radio data terminals 44 may not transmit voice until a request is made to do so using a data message indicating such request. When, and only when, such request is granted, may the requesting terminal transmit voice, and even here, only after the NCP converts the system to voice mode operation and indicates such by transmitting a supervisory, subaudible code signal. The other radio data terminals in the system are prevented from accessing the channel during the pendency of either a data or voice message. While data is on the system channel the inhibit bits are set in the outbound data stream as previously described and will cause another radio data terminal when it monitors the channel to wait a random time before it attempts access again. Likewise, if a data terminal, when monitoring a channel, encounters voice, such terminal will again wait a random time before attempting to access again. It should be pointed out, however, since voice activity inherently results in a longer use of the channel, that the random times waited by other radio terminals attempting access must necessarily be longer when the system is operating with voice communication. In other words, the inhibit times should be longer for voice operation than for data. This is depicted in the flow chart as shown in FIG. 5.

As shown therein, when a message is ready to be sent by a radio data terminal 44 at step 80, the channel is monitored to determine if the inhibit bits are set at step 82. If yes, indicating the channel is in use for data operation, the standard (short) random inhibit timer is activated at step 84, such timer being in the range of 0 to 250 milliseconds. The terminal seeking access waits a random time within this range at step 86 and attempts channel access again at step 80. Conversely, if inhibit bits are not detected as being set (step 82) the terminal determines if voice is on the channel at step 88 and, if not, sends its message in the usual manner. If the voice is detected, the terminal sets the long (voice) random timer at step 92, in the range of 0 to 10 seconds, and waits a random time within that range at step 94 before again attempting channel access at step 80.

In this way, the number of messages that may otherwise be lost due to repeated collisions for channel access may be significantly reduced when the system is operating in the voice mode, because the "long" inhibit timer is invoked rather than the standard or short term timer utilized when in data mode since the data messages are normally much shorter in duration than voice.

As mentioned previously, one of the advantages of the system of the present invention is that it maintains a user specified maximum percent utilization of voice on the channel. This guarantees the channel will be reserved for a given level of data activity. As an example, if the maximum amount of voice traffic is chosen not to exceed 15 percent, the system will be conditioned to guarantee that 85 percent of the available time will be devoted to data traffic. Of course, this ratio can be changed as needed or simply preferred.

This selection of setting the ratio of data to voice utilization is an important aspect in the decision by the NCP 40 in determining whether or not to immediately grant authorization or voice communication when a request is received from a system radio data terminal 44, or, if not, to queue the request for later grant on a first in, first out basis when the request may be honored.

Figure 6:
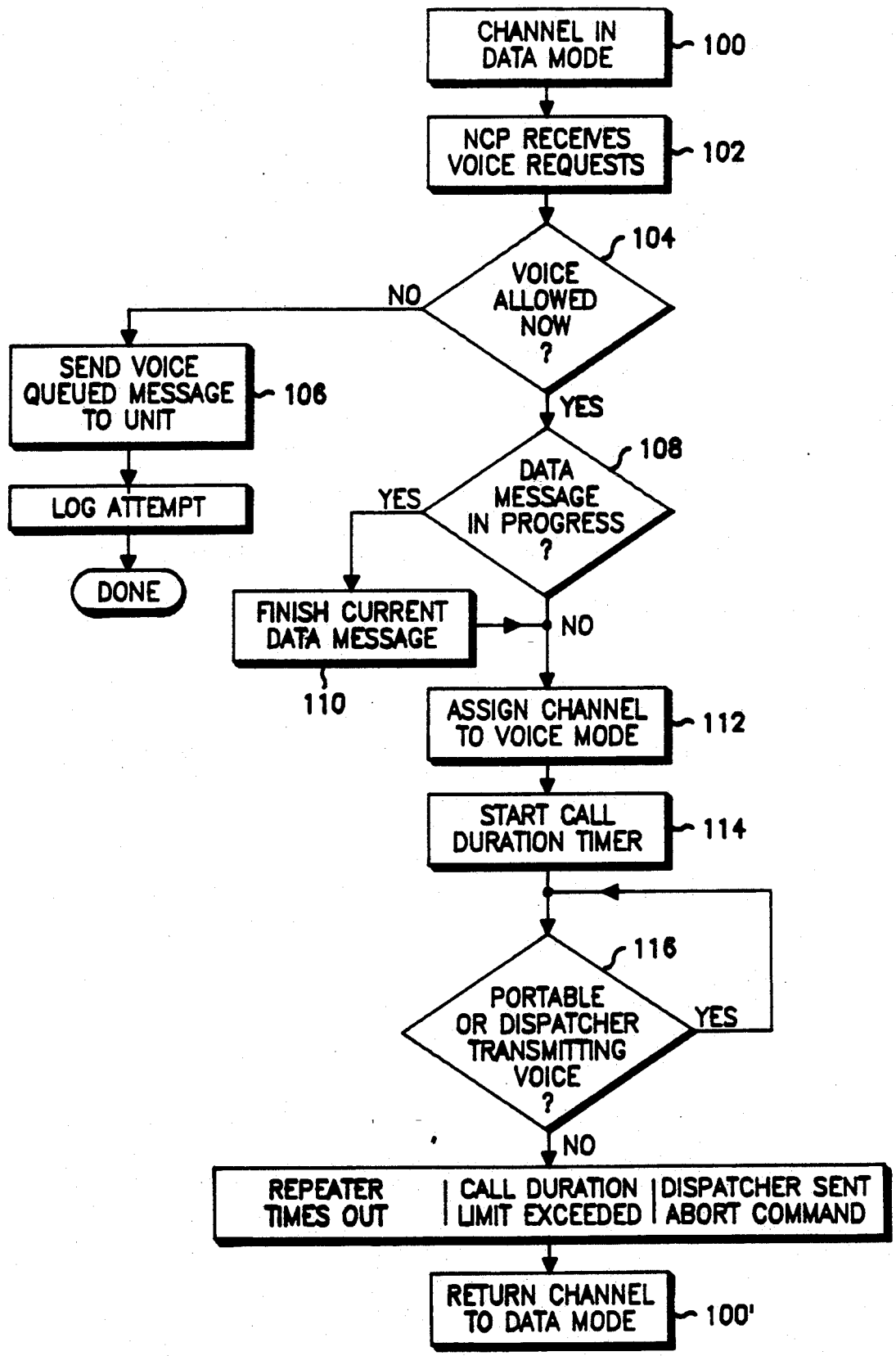
FIG. 6 is a flow diagram of the voice call assignment procedure effected by the NCP for granting or not granting a voice request.

This decision-making process and procedure is depicted in the flow chart as shown in FIG. 6. The algorithm as therein contained determines the voice call assignment procedure as well as maintaining the specified ratio of data to voice traffic. When a period of voice activity ends, the NCP 40 temporarily stores the duration of the voice message. It then computes a "data interval" based on this voice message duration and the desired or specified maximum utilization of the channel for voice. This data interval may be determined as follows:

$$\text{Data Interval} = \frac{(1 - \text{Max. Voice Util.})}{\text{Max. Voice Util.}} \times \text{Voice Message Duration.}$$

Any voice RTT received during this data interval (steps 102, 104) is then queued, step 106, for later processing on a FIFO basis when voice is permitted. There is, of course, a minimum length to the "data interval" of several seconds to handle any data activity which may be pending as a result of voice being on the channel. This minimum data interval can be a fixed length based on estimates of the data traffic on the system, or it may be dynamically adjusted according to the NCP estimate of current "penned-up" data traffic. This may, for example, be derived from the NCP out bound message queues.

It will be appreciated that, if the situation is such that voice may be allowed at step 104, the NCP 40 then checks to see if any data message is in progress at step 108 and, if so, will delay until the current data message is finished at step 110. If there is no data message in process, the assignment of the channel to voice mode may then be made at 112 as described previously. The start call duration timer may be then initiated at step 114 if there is no portable or dispatcher transmitting voice at step 116. The voice communication continues until such time as the repeater times out or the call duration limit has been exceeded or the dispatcher sends an abort command to terminate. Following the cessation of voice communication, the channel is then returned to data mode again at step 100'.

Figure 7:
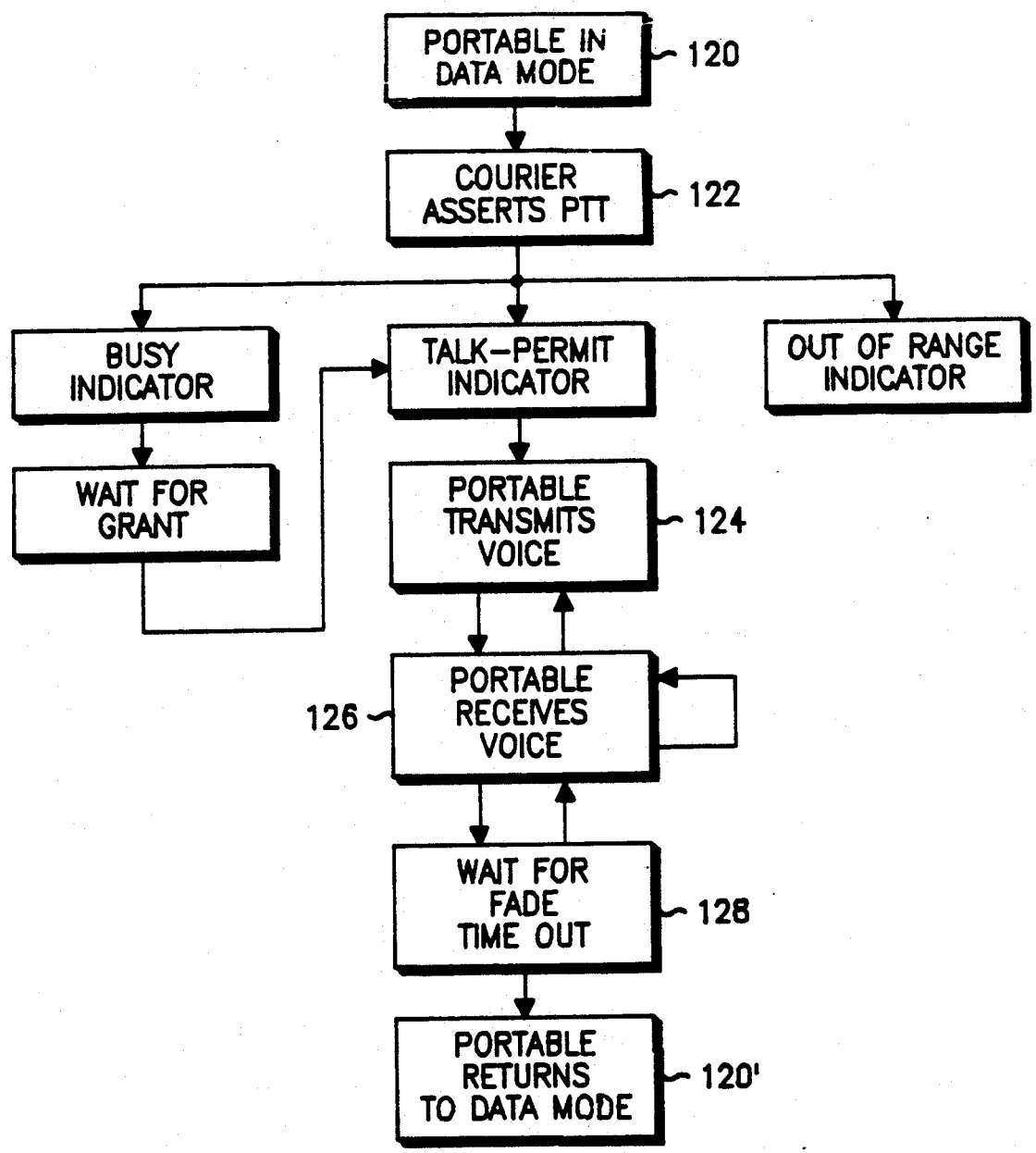
FIG. 7 is a state diagram of a portable radio data terminal operating in the data and voice modes with transition therebetween.

The portable function on voice mode is depicted in the state diagram of FIG. 7. As shown, the portable while in the data mode at step 120 may assert the PTT to request permission for voice communication at step 122 and either receives from the centrally located base station 32 a busy indication or a grant from the central base station for permission to use voice communication.

If a busy indication is first received, it will be understood that the data terminal will await an appropriate time after which the NCP 40 may determine that the grant may be made. If so, it will be made in the manner previously described. If the signal from the NCP 40 cannot be received and processed, an out of range indication will be initiated. As previously indicated, the portable waits for a subaudible coding signal in the outbound message stream to authorize transmission by the portable of voice communication as indicated at step 124. The portable may receive voice by releasing the PTT and monitoring the channel at step 126 and may reassert the PTT to further transmit voice communication by reverting back to step 124. If, however, the portable, in monitoring the channel for voice transmission, fails to receive the same within a specified period of time as indicated at step 128, it simply returns to the data mode as indicated at step 120'.

Figure 8:
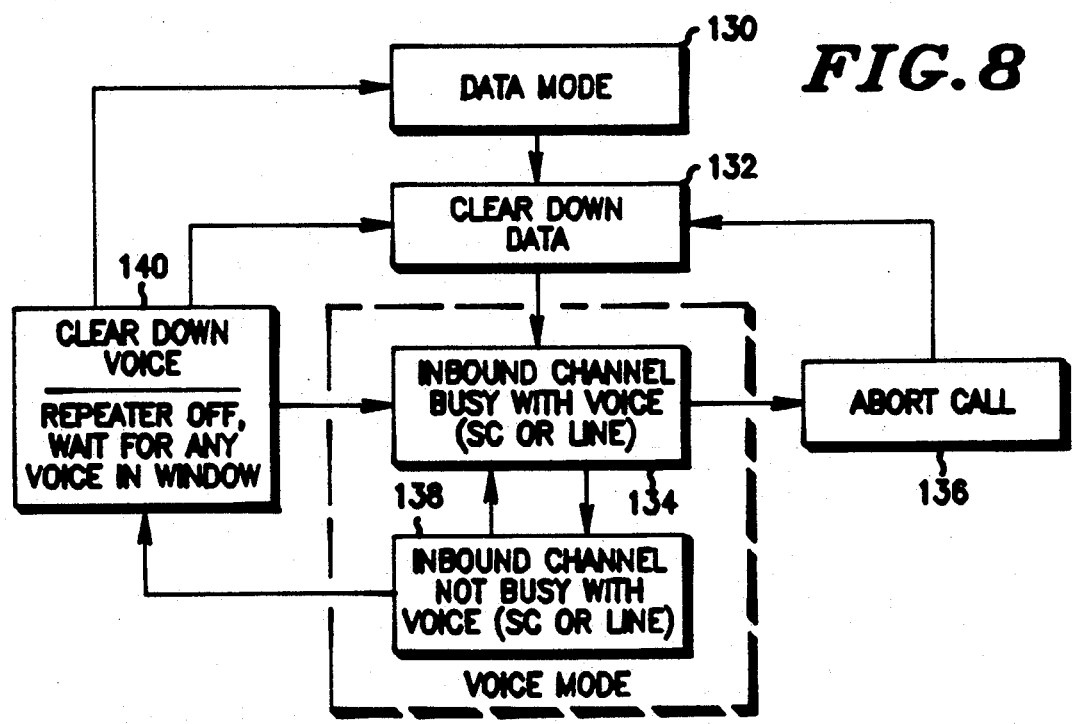
FIG. 8 is a state diagram of the network control processor and base station operating in the data and voice modes with transition therebetween.

A state transition function diagram for the fixed end is indicated in FIG. 8. Assuming that the channel for system 30 is in the data mode at step 130, it will remain in such mode until a request to voice communicate is received from one of the system radio data terminals 44. Upon deciding that such voice may be allowed at that point, the NCP 40 sends out the grant and upon receiving an acknowledgment back initiates the clear down data function at step 132 where it may complete any current outbound message, cause the GCC 46 to be put in the "inhibit-on" mode as well as sending any queued acknowledgments and ensure that the subaudible coding is activated and transmitted on the outbound stream. It then waits for a detect of the subaudible coding or line PTT to indicate that the inbound channel is busy with voice as indicated at step 134. Thereafter the call may be aborted by the dispatcher or by the call duration limit being exceeded, as indicated at step 136, which then causes the repeater to shut down and it will revert to the data mode at step 130 when the portable data terminal is no longer on the channel. Alternatively, if after detecting voice on the channel at step 134, and the call is not specifically aborted, the NCP 40 will monitor the inbound channel, and if subaudible coding or no line PTT is detected, the inbound channel will be determined as not busy and may either, after a repeater drop out time has expired, revert to the clear down voice mode at step 138, or, if the subaudible coding is received before that time, revert back to step 134 where the inbound channel is determined as active and voice is on the channel. Assuming that step 138 has been reached, the repeater will then be turned off and the system will wait for any voice in a predetermined window after which it is returned to the data mode at step 130.

Accordingly, a shared data/voice communication system has been described wherein interference between data and voice mode operation is effectively minimized while at the same time guaranteeing that a set level of system capacity is reserved for data only traffic. The system operates without change on standard data channel access rules or protocol at all times except when a voice transmission has been authorized and is in fact taking place, wherein the specialized voice management protocol takes effect. Long and short delay timers are included in the portable radio data terminals regarding random times the terminals are to wait, depending on whether the system is in voice or data mode, before attempting channel access and thereby minimize message interference as a result of excessive collisions when attempting such access. In this way, any system radio data terminal may request, and when granted, communicate a voice message to the central base station. In like manner, portable-to-portable selective calls may be initiated as well as portable initiated group calls, dispatcher initiated selective calls, dispatcher initiated group calls, portable initiated emergency calls when the channel is in data mode, and portable initiated emergency calls when the channel is in voice mode.

Accordingly, what is claimed is:

1. A shared RF data/voice communication system operating on a communications channel and having a central base station controlled by a network control processor which grants channel access only when the channel is clear and a plurality of radio data terminals with voice capability, said system operating normally in a data mode, and wherein data priority is maintained for a set but programmable level of data usage, comprising in combination:
   means in each of the data terminals for seeking access to the communication channel and requesting voice mode operation by transmitting a predetermined data packet;
   means in said network control processor for granting the request, operating the central base station in voice mode and inhibiting all other system terminals from sending data messages during the pendency of said requesting terminal operating in voice mode;
   means for terminating voice mode operation and returning the base station to data mode only operation; and
   means in said network control processor for maintaining a set, programmable level of data traffic for the communication system as compared to voice traffic by denying any voice mode request by a terminal when said programmable level of data traffic has not been reached.

2. A shared data/voice communication system in accordance with claim 1 wherein said means requesting voice mode operation includes means for transmitting a data packet in accordance with the standard data channel access protocol.

3. A shared data/voice communication system in accordance with claim 1 wherein said means for granting said request for voice mode operation includes means for computing a data interval and allowing voice communication only if said computed data interval has expired.

4. A shared data/voice communication system in accordance with claim 3 wherein said data interval is computed as equal to:

$$\frac{1 - \text{max. voice utilization}}{\text{max. voice utilization}} \times \text{voice message duration}$$

where the maximum voice utilization is the programmable level of voice communication that is elected for system operation and the voice message duration is a duration of the last such message it transmitted on the system.

5. A shared data/voice communication system in accordance with claim 1 wherein said means for terminating voice mode operation includes means operating in response to either the call duration limit being exceeded, the base station timing out or the dispatcher transmits an abort command.

6. A shared data/voice communication system in accordance with claim 1 wherein said network control processor in inhibiting other system terminals during pendency of an inbound message includes means for setting inhibit bits at predetermined locations on the outbound data stream.

7. A shared data/voice communication system in accordance with claim 6 wherein said means in said radio data terminal for seeking access to the communication channel includes means for first determining if said inhibit bits are set, and if so, for initiating a short random inhibit timer, and if not, for either initiating a long random inhibit timer if voice is detected on the communication channel or sending its intended message if voice is not detected on the communication channel.

8. A shared data/voice communication system in accordance with claim 7 wherein the short random timer is in the range of 0-250 milliseconds.

9. A shared data/voice communication system in accordance with claim 7 wherein the long random timer is in the range of 0-10 seconds.

10. A shared data/voice communication system in accordance with claim 1 wherein the grant by the network control processor in response to a request for voice mode communication includes the further transmission of a subaudible code signal indicating the requesting data terminal may commence voice communication.

11. A portable radio data terminal intended for operation in a shared data/voice communication system normally operating in a data mode, including in combination:
means for seeking access to the communication channel and requesting voice mode for the communication system by transmitting a predetermined data packet;
means for responding to a grant transmitted on an outbound data stream from a centrally located base station;
means for initiating a voice message upon receipt of a subaudible code signal from the base station by retransmitting said code signal in combination with the intended voice message; and
means for terminating said voice mode operation in response to the occurrence of any set, predetermined conditions.

12. A portable radio data terminal in accordance with claim 11 wherein said means for seeking access to the communication channel includes means for first determining if inhibit bits are set in the outbound stream on the communication channel, and if so, for initiating a short random inhibit timer, and if not, for either initiating a long random inhibit timer, if voice is detected on the communication channel, or sending its intended message if voice is not detected on the communication channel.

13. A portable radio data terminal in accordance with claim 12 wherein the short random timer is in the range of 0-250 milliseconds.

14. A portable radio data terminal in accordance with claim 12 wherein the long random timer is in the range of 0-10 seconds.

15. A portable radio data terminal in accordance with claim 11 wherein said means for terminating voice mode operation includes means operating in response to either of the call duration limit being exceeded, the base station timing out or the dispatcher transmitting an abort command.

16. In a shared RF data voice communication system operating on a communications channel and having a central base station controlled by a network control processor which grants channel access only when the channel is clear, and a plurality of radio terminals, said system normally operating in a data mode, a method for permitting such radio data terminals to further operate on voice mode while maintaining a set, but programmable level for which data priority is maintained, comprising the steps of:
providing the radio data terminals with voice capabilities;
permitting any one of the radio data terminals to seek access to the communication channel and request voice mode by sending a predetermined data packet;
having the network control processor grant the request under specified conditions, operating the central base station in voice mode and inhibiting all other system terminals from sending any data messages during the pendency of the requesting terminal operating in voice mode;
terminating voice mode operation and returning the base station to data mode only operation; and
having the network control processor deny any voice mode requests by any radio data terminal when said programmable level of data traffic has not been reached.

17. A method in accordance with claim 16 wherein the granting of said request for voice mode operation includes the step of first computing a data interval and allowing voice communication only if said computed data interval has expired.

18. A method in accordance with claim 17 wherein said data interval is computed as equal to:

$$\frac{1 - \text{max. voice utilization}}{\text{max. voice utilization}} \times \text{voice message duration}$$

where the maximum voice utilization is the programmable level of voice communication that is elected for system operation and the voice message duration is a duration of the last such message it transmitted on the system.

19. A method in accordance with claim 16 wherein the terminating of voice mode operation may be in response to either the call duration limit being exceeded, the base station timing out or the dispatcher transmitting an abort command.

20. A method in accordance with claim 16 wherein said network control processor in inhibiting other system terminals during pendency of an inbound message is effected by setting inhibit bits at predetermined locations on the outbound data stream.

21. A method in accordance with claim 16 wherein in seeking access to the communication channel it is first determined if said inhibit bits are set, and if so, initiating a short random inhibit timer, and if not, either initiating a long random inhibit timer if voice is detected on the communication channel or sending its intended message if voice is not detected on the communication channel.

22. A method in accordance with claim 21 wherein the short random timer sets a time within the range of 0-250 milliseconds.

23. A method in accordance with claim 21 wherein the long random timer sets a time within the range of 0-10 seconds.

24. A method in accordance with claim 16 wherein the granting by the network control processor in response to a request for voice mode communication includes further transmitting a subaudible code signal indicating the requesting data terminal may commence voice communication.

* * * * *